United States Patent
Henrichsen et al.

(10) Patent No.: US 8,164,342 B2
(45) Date of Patent: Apr. 24, 2012

(54) SYSTEM AND METHOD FOR CASCADE INFORMATION HANDLING SYSTEM MANUFACTURE

(75) Inventors: Nathan Henrichsen, Austin, TX (US); Doug Meek, Round Rock, TX (US); Jack P. Ramsey, Jr., Hendersonville, TN (US); John D'Andrea, Georgetown, TX (US); Matthew Alan Schultz, Mount Juliet, TN (US); Widodo Sulistyono, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 527 days.

(21) Appl. No.: 12/536,660

(22) Filed: Aug. 6, 2009

(65) Prior Publication Data

US 2011/0035042 A1  Feb. 10, 2011

(51) Int. Cl.
  *G01R 31/00* (2006.01)
(52) U.S. Cl. ............. 324/500; 324/765.02; 365/201
(58) Field of Classification Search .......... None
  See application file for complete search history.

(56) References Cited

U.S. PATENT DOCUMENTS

| | | | |
|---|---|---|---|
| 4,852,001 A | 7/1989 | Tsushima et al. | |
| 4,931,944 A | 6/1990 | Richter et al. | |
| 6,323,666 B1 * | 11/2001 | Ohba | 324/750.05 |
| 6,377,897 B1 * | 4/2002 | Boyington et al. | 702/81 |

* cited by examiner

*Primary Examiner* — Jermele M Hollington
*Assistant Examiner* — Trung Nguyen
(74) *Attorney, Agent, or Firm* — Hamilton & Terrile, LLP; Robert W. Holland

(57) ABSTRACT

Information handling system manufacture through a burn rake that burns images and tests information handling systems is managed with a cascade first-in-first-out manufacture by allowing a predetermined burn time for each information handling system at each burn location. The predetermined burn time includes a projected burn time, a burn variation buffer and a standard repair time buffer that ensures a complete burn for substantially all information handling systems. Increasing the number of systems having a complete burn supports first-in-first out loading and unloading of information handling systems at burn locations so that the burn manufacture process occurs in a consistent cascade that proceeds down the length of the burn rack from a first end to a second end.

20 Claims, 3 Drawing Sheets

US 8,164,342 B2

SYSTEM AND METHOD FOR CASCADE INFORMATION HANDLING SYSTEM MANUFACTURE

BACKGROUND OF THE INVENTION

1. Field of the Invention

The present invention relates in general to the field of information handling system manufacture, and more particularly to a system and method for single piece, first in first out (FIFO) flow for information handling system manufacture.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One advantage with the purchase of information handling systems is that selection from the wide number of components available to build information handling system allows end users to tailor information handling systems for specific functions and price points. In a build to order manufacture process, a manufacturer accepts end user orders that specify hardware and software components for an information handling system and then builds the information handling systems according to the end user's order manifest. End users select from chassis and housings having a variety of shapes and sizes and load the chassis or housing with components having a wide variety of capabilities. For example, different processors have varying processing speeds and power consumptions, and different types and quantities of RAM can significantly impact processing capability. Selection of less capable components reduces system cost while still meeting requirements for desired functions, such as word processing.

Manufacturers of built-to-order information handling systems face some unique difficulties in the manufacture process. A typical assembly-line approach for information handling systems having varied configurations often results in inefficiencies because each information handling system coming down the line has unique attributes. One approach that helps to maintain a conventional progressive assembly line is removing high variation components from the assembly line to a separate assembly process. Variations include both specialized hardware components and specialized software components which often introduce variation in the "burn" time for loading and testing the software on the information handling system. Moving process steps out of the progressive assembly line introduces multiple inefficiencies in manufacture with separate and suboptimal assembly process components. The separation into multiple assembly processes leads to higher order cycle time, higher work in progress, reduced order purity, decreased space utilization, excessive capital investment and an overall higher cost to manufacture product.

An example that illustrates the difficulty of build-to-order manufacture is the use of a burn rack for multiple variations of information handling systems. Because the burn time varies significantly based upon configuration, adjacent locations of the burn rack will have finished products at widely varying times. A common end user purchase order manifest for multiple systems will have those systems spread across divergent locations of the burn rack, increasing the complexity of accumulating common orders upon completion of manufacture. Further divergence occurs when a system from an order of multiple systems fails a test or is otherwise sidetracked during software burn. As a result, traditional progressive assembly processes perform software burn disconnected from the assembly line. A burn area is set aside for accumulation of systems to account for variations in work content as well as time taken by test failures and repairs during system burns. However, the burn are often becomes an area of inefficiency in that related orders are distally spread throughout the rack leading to difficulties gathering related systems to forward to shipping.

SUMMARY OF THE INVENTION

Therefore a need has arisen for a system and method which manufactures information handling systems in a single piece flow fashion for improved software burn rack efficiency.

In accordance with the present invention, a system and method are provided which substantially reduce the disadvantages and problems associated with previous methods and systems for manufacture of information handling systems with high variations in burn time. A burn time that includes an acceptable burn variation is used to determine when to unload information handling systems from a burn rack so that a single piece flow first-in-first-out burn rack loading and unloading process is employed. Performing loading and unloading at each of successive vertical columns of burn locations improves burn rack efficiency.

More specifically, a burn rack having plural burn locations performs information handling system burn after assembly of the physical components of each information handling system. Information handling system burn includes copying of an image to permanent memory of an information handling system by an image engine and testing of information handling systems by a test engine. A burn rack manager determines burn locations to accept information handling systems in a cascade first-in-first-out manufacture process. For example, burn locations are assigned to similar configurations or common orders so that the systems remain adjacent to each other, such as by loading the systems in vertical columns of the burn rack. A burn time engine determines a burn time that expires before the information handling systems are unloaded. The burn time includes the projected time for burn of an information handling system based upon the configuration of the information handling system, including copying of an image and testing of the system, plus a normal variation time that accounts for most variances from the projected burn time, such as time expected for repairs. The normal variance is set for a predetermined percent of information handling systems to complete burn, such as 99 percent of information handling systems having a selected configuration thereby normalizing a non-normal process. If an information has not completed burn at expiration of burn time, the loading and unloading of burn locations is stopped until resolution of any issues delaying the burn. In this manner, cascade loading and unloading of subsequent adjacent columns is maintained for overall manufacture efficiency.

The present invention provides a number of important technical advantages. One example of an important technical advantage is that purity of multiple system orders is maintained by building the systems in a single piece, first-in-first-out flow. Order purity reduces the complexity of packaging and shipping orders to an end user with all of the orders arriving for packaging at around the same time. Another example of an important technical advantage is that immediate feedback of build issues is available to operators thus providing a learning curve that results in improved workmanship and reduced failures. A first-in-first-out order to manufacture system is maintained through software burn, including copying of images and system test, so that management of the manufacture process is simplified. Maintaining a cascade of systems through the burn process improves manufacture ergonomics by reducing the amount of travel performed by assembly line personnel as systems are placed into and taken out of the burn rack. The clearly defined manufacture flow through the burn racks simplifies the manufacture process, saving time and money.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Management of information handling systems at a burn rack by allotting a burn time that includes normal variation of a burn time for each system improves manufacture efficiency by allowing a first-in-first-out cascade of systems at the burn rack. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
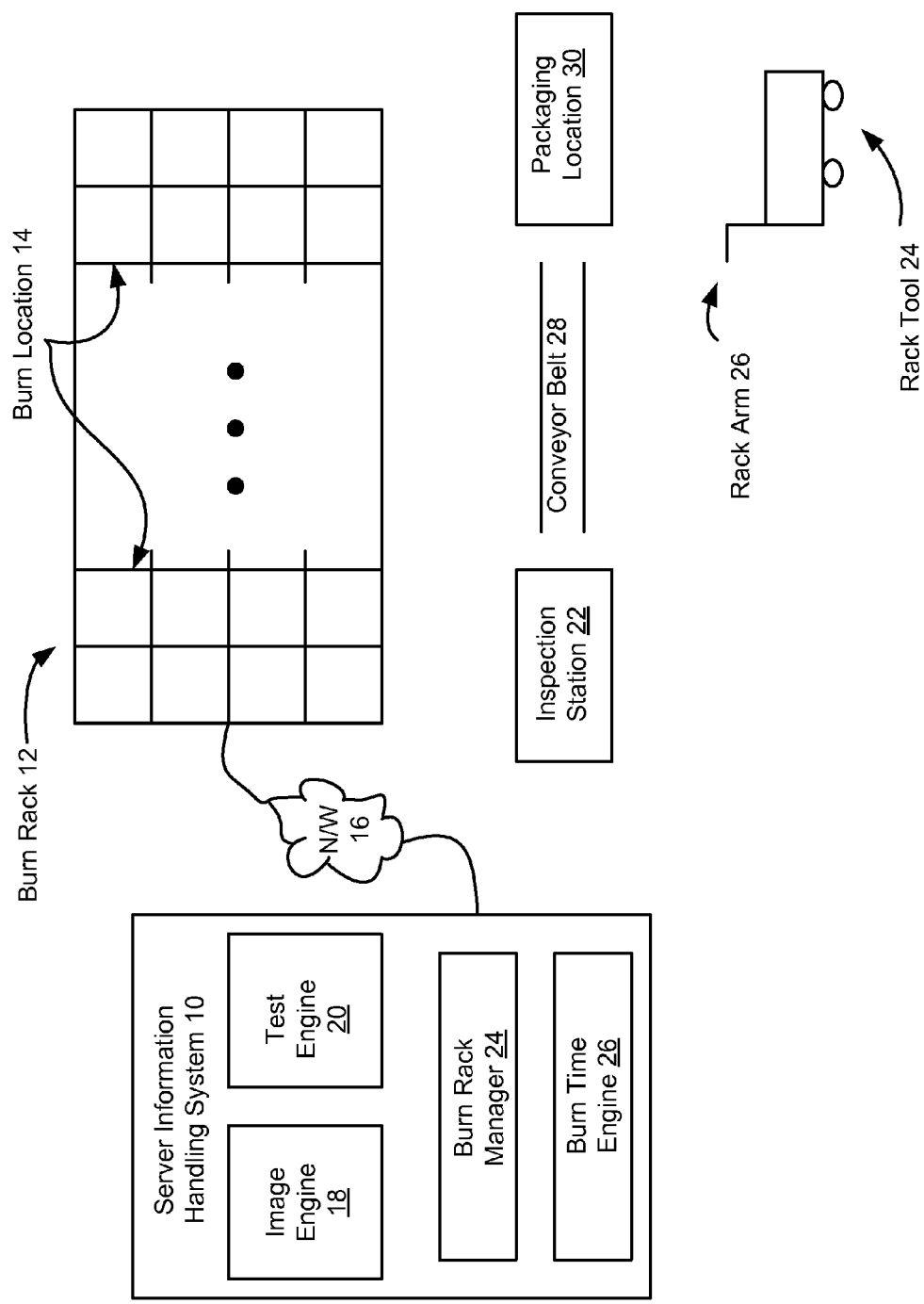
FIG. 1 depicts a block diagram of a system for manufacture of information handling systems having plural configurations.

Referring now to FIG. 1, a block diagram depicts a system for manufacture of information handling systems having plural configurations. A server information handling system 10 interfaces with a burn rack 12 having plural burn locations 14 that are each used to perform a manufacture burn on an information handling system loaded in the burn location 14. Server information handling system 10 has one or more processors and various types of memories to support running of applications that perform information handling system burns through a network interface 16. The manufacture burn of an information handling system includes the copying of an image to memory within a manufactured information handling system by an image engine 18. For example, image engine 18 copies images to information handling systems located in burn locations 14 by writing images through network interface 16 to hard disk drives of the manufactured information handling systems. The manufacture burn of an information handling system also includes testing of functionality at the manufactured information handling system with a test engine 20. For example, test engine 20 executes applications on information handling systems located in burn locations 14 and monitors the output of the applications for an expected result to ensure that the information handling system is operating properly.

For the example embodiment depicted by FIG. 1, manufacture burn begins at inspection station 22 where each assembled information handling system is visually inspected for defects. The assembled information handling systems that pass inspection station 22 are loaded into a burn location 14 of burn rack 12 according to an order determined by a burn rack manager 24. Assembled information handling systems that fail visual inspection are repaired if a repair takes less than a predetermined repair time or are taken out of the cascade flow and repaired off-line while a placard or other marker reserves the burn location designated for the information handling system. Burn rack manager 24 maintains a first-in-first-out cascade burn manufacture flow based upon predetermined burn times provided by a burn time engine 26. Thus, for instance, similar information handling systems are loaded adjacent to each other starting at one end of burn rack 12 and working towards an opposing end and then returning to the starting end. As an example, a rack tool 24 has one rack arm 26 that is sized to ensure single piece flow load and unload to and from four vertically-stack burn locations 14. Burn rack manager 24 manages loads and unloads of burn locations 14 with similar information handling systems so as to optimize efficiencies of rack tool 24 with simultaneous loads and unloads. In the depicted example, individual orders 0 and 1 are loaded into one vertical stack of burn locations 14 along with a common order of information handling systems designated by 2. The adjacent vertical stack has all four burn locations 14 loaded with order 2.

In operation, burn time engine provides a predetermined burn time to burn rack manager 24 which represents the total time allowed for burn of an information handling system. The predetermined burn time includes projected burn time for a normal burn of copying an image and testing an information handling system plus time that represents normal variations of the projected burn time. The normal variation is, for example, the expected burn time for 99 percent of all information handling systems having a given hardware and software configuration, including time to perform repairs on information handling systems that fail testing. By adding such a normal variation to burn time, at the end of the burn time set by burn time engine 26 burn rack manager 24 ensures completion of 99 percent of burns in a burn rack 12 around adjacent burn locations 14. After the predetermined burn time expires, if all burns in an expected vicinity of a burn rack 12 are complete, then rack tool 24 unloads the completed information handling systems to a conveyor belt 28 for transfer to a packaging location 30. If an information handling system has not completed burn by expiration of a predetermined burn time, then cascade loading and unloading is stopped until the reason for the incomplete burn is evaluated. If completion is expected in a suitable time frame, the cascade loading and unloading is stopped until burn is completed and then continued with loading and unloading taking place at each subsequent vertical stack of burn locations 14. If completion will take an inordinate amount of time, the information handling system is removed to an off line location and a placard is placed on conveyor belt 28 to reserve the place of the information handling system in packaging location 30 for packaging after burn is completed.

An advantage of first-in-first-out cascade loading and unloading of information handling systems at burn rack 12 is that the physical loading and unloading of information handling systems is more efficient with rack tool 24 when the information handling systems are proximate to each other. Rack tool 24 simply moves down burn rack 12 at each vertical stack of burn locations 14 from a starting point until the end is reached and then returns to the starting point. Common orders of information handling systems that are to be packaged and shipped together are kept in adjacent burn locations so that packaging is simplified. Although stopping the loading and unloading of information handling systems at burn rack 12 may slow manufacture to certain degree, pauses at identified problem areas, such as where a burn time is exceeded, allows manufacture errors to be identified and corrected so that subsequent systems will not face the same error. In alternative embodiments, alternative burn variation times may be used based on desired manufacture process flow rates and the availability of offline repair facilities.

Figure 2A:
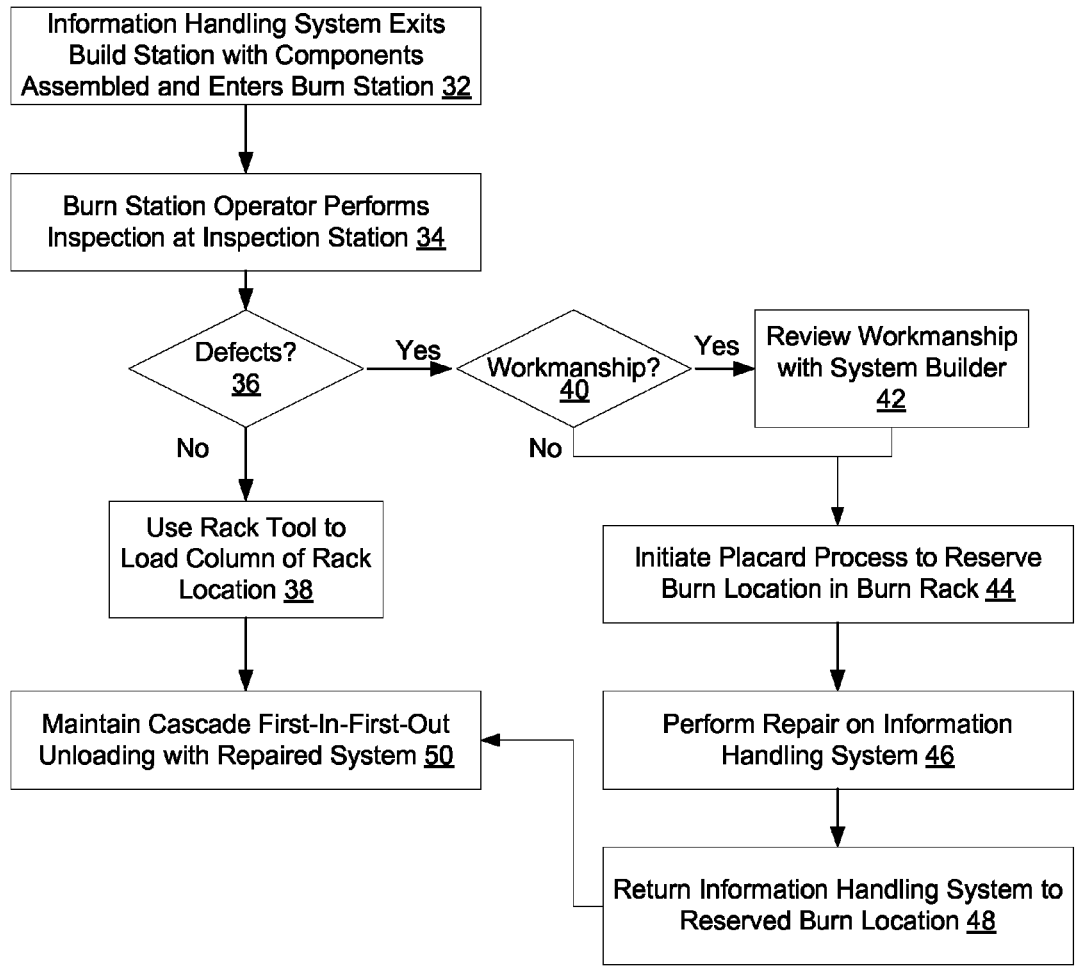
FIG. 2 depicts a flow diagram of a process for manufacture of information handling systems having plural configurations.

Referring now to FIG. 2A, a flow diagram depicts a process for manufacture of information handling systems having plural configurations. The process begins as step 32 with exit of an assembled information handling system from a build station so that assembly of the physical components are substantially complete. At step 34, the information handling system arrives at a burn station for a visual inspection by a burn rack operator for defects. At step 36, a determination is made of whether a defect exists based on the results of the inspection station. If no defects exists, the process continues to step 38 to use a rack tool to efficiently load adjacent systems into a burn rack, such as at a vertical stack of burn locations. If at step 36 a defect is found, the process continues to step 40 to determine if the defect is a workmanship issue. If a workmanship issue is found, the process continues to step 42 to identify the builder of the information handling systems and review the workmanship issue. This allows correction of workmanship issues before those issues repeat in other assembled systems. Rapid attention to workmanship issues before loading an information handling system into a burn rack may slow burn rack loading, but ultimately results in better manufacture efficiency. At step 44, a placard is placed in the burn rack location reserved for the defective information handling system so that burn rack loading and unloading may continue while the defect is addressed. At step 46, the information handling system defect is repaired and, at step 48, the repaired information handling system is loaded into the reserved burn location in placed of the placard. At step 50, loading of the repaired information handling system into the reserved location ensures that the first-in-first-out cascade loading of adjacent vertical columns of burn locations can continue for continuity of the manufacture burn process.

Figure 2B:
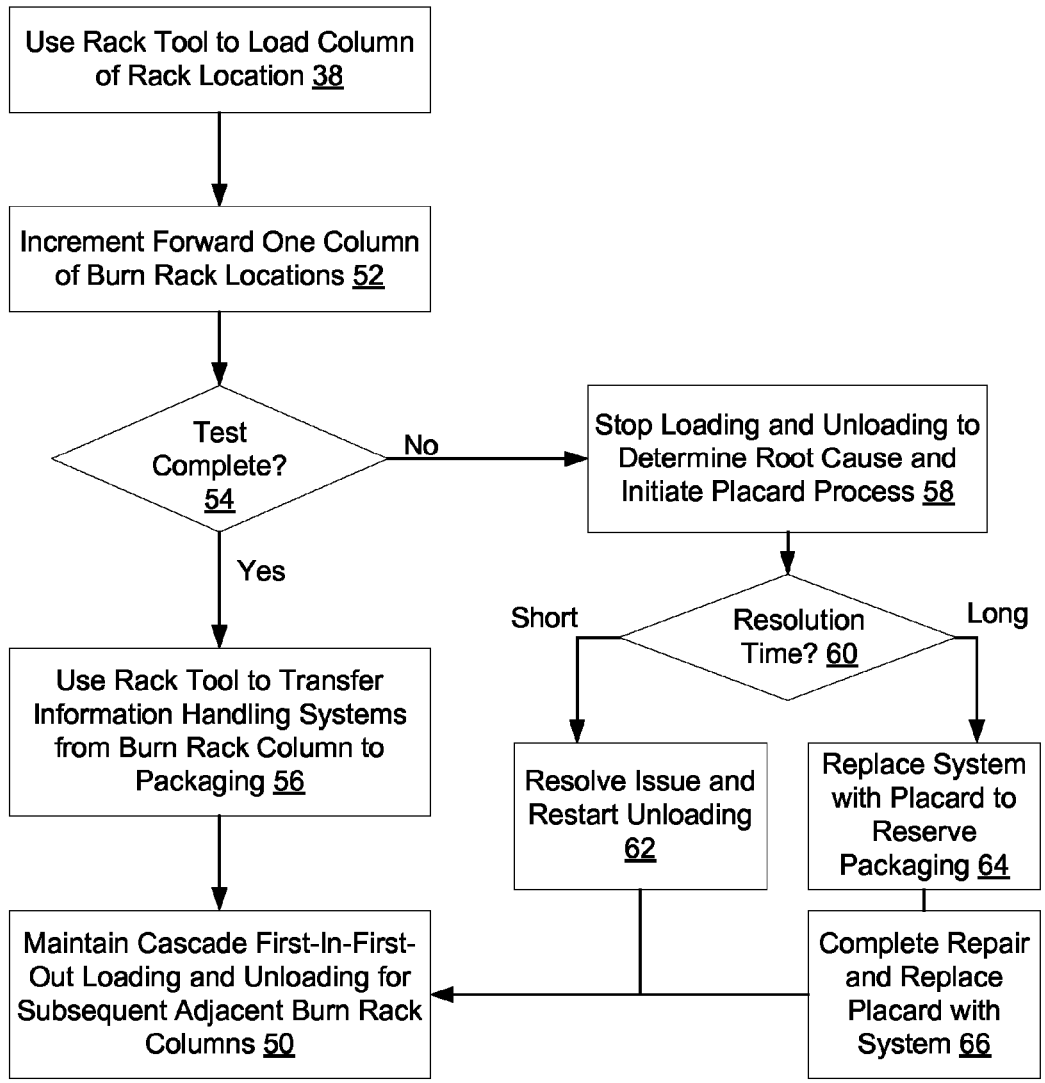

Referring to FIG. 2B, the process continues at step 38 with loading of assembled and inspected information handling systems into adjacent burn locations, such as a vertical column of burn locations. At step 52, after loading of a vertical column of burn locations, the rack tool proceeds forward by a vertical column to unload the next vertical column in preparation of loading newly assembled information handling systems at the vertical column. At step 54, a determination is made of whether the information handling systems have completed burn by completing testing. If yes, the process continues to step 56 to have the rack tool transfer completed information handling systems to a conveyor for transportation to a packaging area. If at step 54 the information handling system has not completed testing, the process continues to step 58 at which the unloading process is stopped to determine the root cause of the continued test and to place a placard in the packaging process to reserve a place for the information handling system at packaging. At step 60 a determination is made of whether the issue can be resolved in a desired resolution time. If yes, the issue is resolved with the loading and unloading process stopped until burn of the information handling system is completed. If at step 64 a determination is made that resolution of the issue will take greater than a resolution time, the placard is sent down the conveyor line to reserve a position for packaging and the information handling system is removed to an offline location to complete burn and perform repair. Loading and unloading is continued while the information handling system is repaired offline and, at step 66, repair is completed so that the information handling system is forwarded to packaging at the placard-reserved location. At step 50, selective on-line repair at step 62 or off-line repair at step 66 ensures that the first-in-first-out cascade loading of adjacent vertical columns of burn locations can continue for continuity of the manufacture burn process.

Although the present invention has been described in detail, it should be understood that various changes, substitutions and alterations can be made hereto without departing from the spirit and scope of the invention as defined by the appended claims.

What is claimed is:

1. A method for manufacture of information handling systems having plural configurations, the method comprising:
building each information handling system with plural physical components defined by a manifest;
ordering the information handling systems by a predetermined assembly factor into a burn rack order;
loading the information handling systems into a burn rack having plural burn locations according to the burn rack order;
copying software onto the information handling systems through the burn rack;
testing the information handling systems through the burn rack;
maintaining the information handling systems in the burn rack for a predetermined burn time having at least a projected burn time and a burn variation buffer; and
removing the information handling systems from the burn rack in a substantially first-in-first-out order.

2. The method of claim 1 further comprising:
detecting a defect in an information handling system before loading into the burn rack; and
reserving a burn rack location for the information handling system at the location according to the burn rack location.

3. The method of claim 2 further comprising:
repairing the defect; and loading the information handling system into the reserved burn rack location.

4. The method of claim 1 further comprising:
determining that an information handling system is in burn at the burn rack at expiration of a predetermined burn time associated with the information handling system; and
stopping the loading of information handling systems to evaluate the information handling system.

5. The method of claim 4 further comprising:
resolving an issue with the information handling system to complete the burn;
removing the information handling system; and
restarting the loading of information handling systems.

6. The method of claim 4 further comprising:
determining that resolving the issue will take greater than a predetermined resolution time;
reserving a packaging location for the information handling system;
removing the information handling system to a repair location; and
restarting the loading of information handling systems.

7. The method of claim 1 wherein loading the information handling systems further comprises loading the information handling systems with a tool supporting simultaneous loading of plural adjacent information handling systems and the burn rack locations comprise adjacent locations.

8. The method of claim 1 wherein the burn variation buffer comprises a software loading buffer and a testing buffer.

9. The method of claim 1 wherein the burn variation buffer comprises a time period during which a predicted predetermined minimum number of information handling systems having a configuration of hardware and software components will complete a burn.

10. The method of claim 9 wherein the predicted predetermined minimum number of information handling systems comprises 99 per cent of the information handling systems having the configuration of hardware and software components.

11. A system for manufacture of information handling systems having plural configurations, the system comprising:
an image engine operable to copy software images to information handling systems;
a test engine operable to test the information handling systems for predetermined functionality;
a burn rack having plural burn locations interfaced with the image engine and test engine and operable to accept information handling systems for interaction with the image engine and test engine; and
a burn rack manager interfaced with the burn rack and operable to schedule loading and unloading of information handling systems at burn locations using a first-in-first-out cascade based upon a predetermined burn time having at least a projected burn time and a burn variation buffer for each information handling system.

12. The system of claim 11 wherein the first-in-first-out cascade comprises loading adjacent burn locations starting at a first end of the burn rack and working towards a second end of the burn rack.

13. The system of claim 11 further comprising an inspection station operable detect defects in an information handling system before loading the information handling system in a burn location and to reserve a burn location in the first-in-first out cascade for the information handling system if a defect delays loading of the information handling system into the burn location.

14. The system of claim 13 wherein the inspection station is further operable to direct loading of the information handling system in the reserved burn location after the defect is repaired.

15. The system of claim 11 wherein the burn rack manager is further operable to determine that an information handling system is in burn at the burn rack at expiration of a predetermined burn time associated with the information handling system and to stop loading of information handling systems to evaluate the information handling system.

16. The system of claim 15 wherein the burn rack manager is further operable to resolve an issue with the information handling system to complete the burn, remove the information handling system, and restart the loading of information handling systems.

17. The system of claim 15 wherein the burn rack manager is further operable to determine that resolving the issue will take greater than a predetermined resolution time, to reserve a packaging location for the information handling system, to remove the information handling system to a repair location, and to restart the loading of information handling systems.

18. The system of claim 11 wherein the burn variation buffer comprises a software loading buffer and a testing buffer.

19. The system of claim 11 wherein the burn variation buffer comprises a time period during which a predicted predetermined minimum number of information handling systems having a configuration of hardware and software components will complete a burn.

20. The system of claim 19 wherein the predicted predetermined minimum number of information handling systems comprises 99 per cent of the information handling systems having the configuration of hardware and software components.

* * * * *